United States Patent
Kreiner et al.

(10) Patent No.: US 7,890,379 B2
(45) Date of Patent: Feb. 15, 2011

(54) METHODS, SYSTEMS, AND PRODUCTS FOR FACILITATING ELECTRONIC PURCHASES

(75) Inventors: Barrett Morris Kreiner, Woodstock, GA (US); Ronald Perrella, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 11/303,131

(22) Filed: Dec. 16, 2005

(65) Prior Publication Data

US 2007/0150361 A1 Jun. 28, 2007

(51) Int. Cl.
*G06Q 30/00* (2006.01)
(52) U.S. Cl. .......................... 705/26; 705/27
(58) Field of Classification Search ............... 705/26, 705/27
See application file for complete search history.

(56) References Cited

U.S. PATENT DOCUMENTS

| | | | |
|---|---|---|---|
| 6,029,141 A | 2/2000 | Bezos et al. | |
| 6,101,482 A | 8/2000 | DiAngelo et al. | |
| 6,405,176 B1 | 6/2002 | Toohey | |
| 6,850,899 B1 | 2/2005 | Chow et al. | |
| 6,873,968 B2 * | 3/2005 | Ehrlich et al. | 705/26 |
| 6,882,981 B2 | 4/2005 | Philippe et al. | |
| 6,970,837 B1 * | 11/2005 | Walker et al. | 705/26 |
| 2002/0002496 A1 * | 1/2002 | Miller et al. | 705/26 |
| 2002/0026386 A1 * | 2/2002 | Walden | 705/27 |
| 2002/0087663 A1 * | 7/2002 | Chou et al. | 709/219 |
| 2002/0143660 A1 * | 10/2002 | Himmel et al. | 705/27 |
| 2002/0156685 A1 * | 10/2002 | Ehrlich et al. | 705/26 |
| 2004/0002900 A1 * | 1/2004 | Cohen et al. | 705/26 |
| 2005/0131772 A1 | 6/2005 | Chow et al. | |
| 2006/0111986 A1 * | 5/2006 | Yorke et al. | 705/26 |
| 2006/0190348 A1 * | 8/2006 | Ofer et al. | 705/26 |

OTHER PUBLICATIONS

Mack, Ann, Choose Me, Ichoose alerts e-shopers to better offers, Brandweek, Apr. 10, 2000.*

* cited by examiner

*Primary Examiner*—Jason Dunham
(74) *Attorney, Agent, or Firm*—Scott P. Zimmerman PLLC

(57) ABSTRACT

Methods, systems, and products are disclosed for facilitating electronic purchases. A record of a customer's selection of items is received at a merchant's server. Some items in the record are associated with a different merchant and were selected from the different merchant's website. The merchant inspects the record for items associated with the different merchant. The merchant sends a recommendation to the customer to remove a different merchant's item and to instead add a substitute item associated with the merchant.

15 Claims, 7 Drawing Sheets

METHODS, SYSTEMS, AND PRODUCTS FOR FACILITATING ELECTRONIC PURCHASES

NOTICE OF COPYRIGHT PROTECTION

A portion of this disclosure and its figures contain material subject to copyright protection. The copyright owner has no objection to the facsimile reproduction by anyone of the patent document or the patent disclosure, but otherwise reserves all copyrights whatsoever.

BACKGROUND

This application generally relates to data processing and, more particularly, to automated electrical financial or business practice or management arrangement.

Shared or common shopping carts are known. When a customer electronically shops online merchants, the customer establishes an electronic shopping cart. Some online merchants accept and recognize a common or universal shopping cart, in which the customer's shopping cart contains items from multiple merchants. That is, the customer visits multiple merchants and fills their cart with items from one or more of the merchants. Despite the different merchants, the customer makes a "single check-out" transaction.

These shared or common shopping carts, however, can be improved. As the customer electronically shops the various merchants, there is no easy method of comparing each merchant's products and services. The customer must locate an item at one merchant's website, then logout and visit a different merchant's website. If multiple merchants offer similar items, the customer must visit each merchant's website and make comparisons. What is needed, however, are advancements that automate comparison shopping and that promote competition amongst merchants.

SUMMARY

The aforementioned problems, and other problems, are reduced, according to the exemplary embodiments, using methods, systems, and products that facilitate electronic purchases. The exemplary embodiments describe an electronic commerce software application that analyzes an electronic record, such as an electronic shopping cart. This electronic commerce application, however, provides features that promote competition between merchants. For example, before a customer "checks out" and purchases items in the shopping cart, the exemplary embodiments allow a merchant to "peek" inside the cart. The merchant can inspect the items in the shopping cart and determine whether better terms can be offered for items in the cart. If a merchant can offer better terms (such as a lower price), exemplary embodiments permit the merchant to pluck another merchant's items from the cart. That is, one merchant can delete a different merchant's items from the customer's electronic shopping cart. If, for example, TARGET® can offer a lower price, better financing, or any other appealing terms, TARGET® may remove WAL-MART® items from a customer's cart. The exemplary embodiments, then, promote competition amongst merchants to the benefit of the customer.

The exemplary embodiments include methods, systems, and products for facilitating electronic purchases. One such method receives at a merchant's server a record of a customer's selection of items. Some items in the record are associated with a different merchant and were selected from the different merchant's website. The merchant inspects the record for items associated with the different merchant. The merchant sends a recommendation to the customer to remove a different merchant's item and to instead add a substitute item associated with the merchant.

In another of the embodiments, a system facilitating electronic purchases. An electronic commerce application stores in memory, and a processor communicates with the memory. The processor receives a record of a customer's selection of items. Some items are associated with a different merchant and are selected from the different merchant's website. The processor inspects the record for items associated with the different merchant. The processor sends a recommendation to the customer to remove a different merchant's item and to instead add a substitute item associated with the merchant.

In yet another embodiment, a computer program product manages communications. The computer program product comprises a computer-readable medium storing computer code for receiving at a merchant's server a record of a customer's selection of items. Some of the items are associated with a different merchant and are selected from the different merchant's website. The record is inspected for items associated with the different merchant. A recommendation is sent to the customer to remove a different merchant's item and to instead add a substitute item associated with the merchant.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

Figure 1:
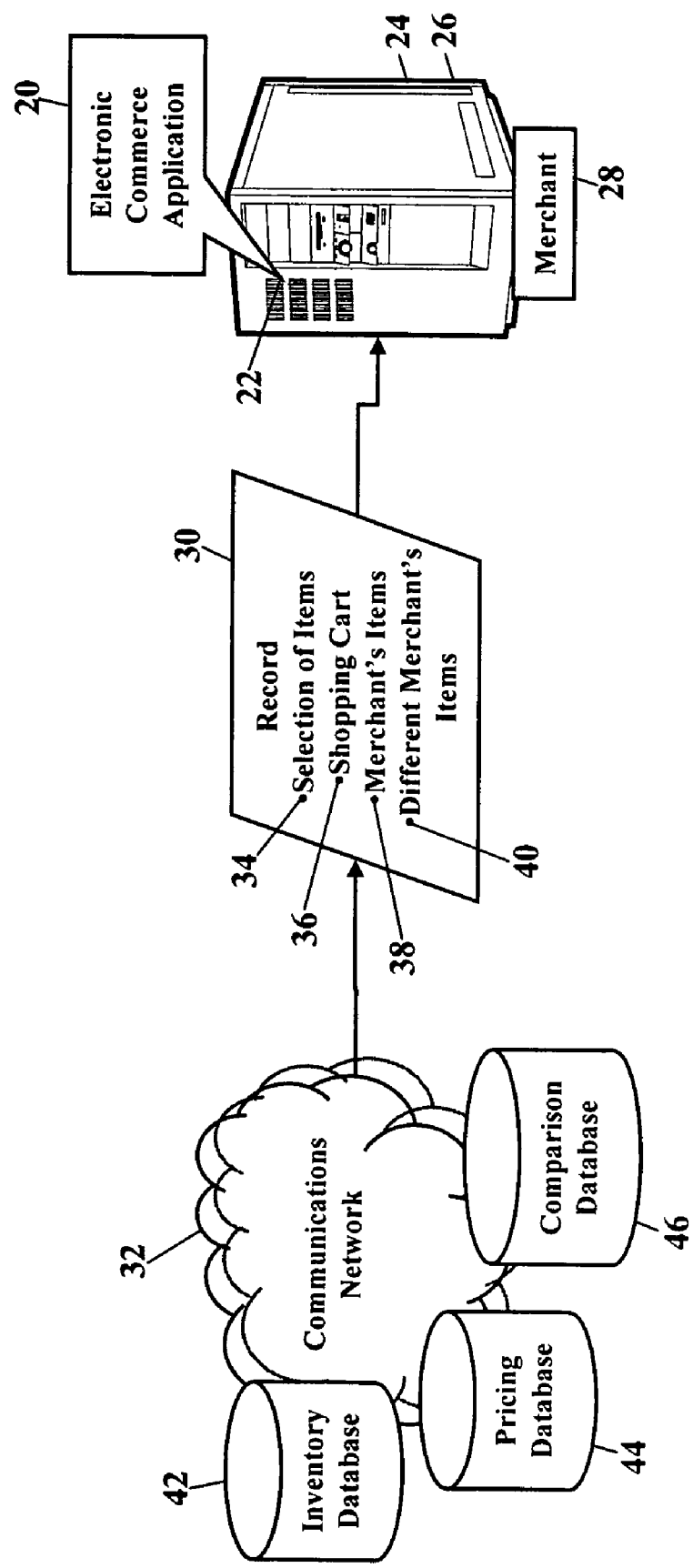
FIG. 1 is a schematic illustrating an electronic commerce application, according to exemplary embodiments.

FIG. 1 is a schematic illustrating an electronic commerce application 20, according to exemplary embodiments. The electronic commerce application 20 is a set of processor-executable instructions that are stored in memory 22 of a communications device 24. Although the communications device 24 is shown as a computer server 26, the communications device 24, as will be later explained, may be any processor-controlled device. Whatever the communications device 24, the electronic commerce application 20 facilitates e-commerce purchases by a customer. As the customer selects items for a shopping cart, exemplary embodiments permit a merchant to inspect the contents of that shopping cart. If the merchant can offer a lower price on an item in shopping cart, then that merchant can remove another merchant's item from the shopping cart and, instead, add a substitute and/or comparable item. Exemplary embodiments, then, promote competition amongst merchants by allowing merchants to "peek" inside the shopping cart. Merchants may recommend alternative items, or cheaper items, that benefit the customer.

FIG. 1 illustrates some of the exemplary embodiments. The computer server 26 is affiliated with, operated by, or owned by a merchant 28. The computer server 26 may alternatively or additionally be operated on behalf of the merchant 28, such that at least a portion of the memory 22 stores data on behalf of the merchant 28. The computer server 26 receives a record 30 via a communications network 32. The record 30 electronically describes a selection 34 of items a customer wishes to purchase. Although the record 30 may have any electronic structure, the record 30 may be an electronic shopping cart 36 that contains a description of the items. The record 30 may comprise the merchant's items 38, and the record 30 may comprise at least some different merchant's items 40. That is, the record 30 includes items selected by the customer from a different merchant's e-commerce website. Multiple merchants receive the record 30 (e.g., the shopping cart 36), and the customer can select items from each merchant's site prior to commencing a single sale transaction (e.g., "single checkout"). Because a common or shared electronic shopping cart is known, this patent will not further discuss the structure of the record 30. If, however, the reader desires a more detailed explanation, the reader is invited to consult the following references, with each reference incorporated herein by reference in their entirety: U.S. Pat. No. 6,029,141 to Bezos et al. (Feb. 22, 2000); U.S. Pat. No. 6,101,482 to DiAngelo et al. (Aug. 8, 2000); U.S. Pat. Nos. 6,029,141 to 6,405,176 to Toohey (Jun. 11, 2002); U.S. Pat. No. 6,850,899 to Chow et al. (Feb. 1, 2005); U.S. Pat. No. 6,882,981 to Philippe et al. (Apr. 19, 2005); and Published U.S. Patent Application 2005/0131772 to Chow et al. (Jun. 16, 2005).

When the merchant's computer server 26 receives the record 30, the electronic commerce application 20 inspects the record 30. The electronic commerce application 20 reviews the record 30 for items associated with the different merchants. When the electronic commerce application 20 finds a different merchant's item, the electronic commerce application 20 determines whether the merchant can offer better terms for that item. The electronic commerce application 20, for example, may determine if a lower price may be offered on the same item, a comparable item, and/or a substitute item. The electronic commerce application 20 may additionally or alternatively offer different financing and/or warranty terms that may entice the customer to switch merchants. The electronic commerce application 20 may additionally or alternatively offer an item with more or different features, higher performance, different colors, better safety features or specifications, or an immediate availability. The electronic commerce application 20 may additionally or alternatively offer a bundle of items to replace one or more items from a different merchant.

The electronic commerce application 20 may query inventory, pricing, and other systems. As the electronic commerce application 20 determines whether the merchant can offer better terms, the electronic commerce application 20 may query an inventory database 42, a pricing database 44, and/or a comparison database 46. The inventory database 42 stores inventory records, and the electronic commerce application 20 queries the inventory database 42 to determine whether the merchant's item can be shipped within some date parameter. The pricing database 44 stores pricing information, and the electronic commerce application 20 queries the pricing database 44 when comparing prices. The comparison database 46 stores comparison records, such as the above-mentioned financing and/or warranty terms, different features, higher performance, different colors, better safety features or specifications, or any other comparison. The electronic commerce application 20 queries the comparison database 46 to determine which of the merchant's items could be a comparable item, a substitute item, or an alternative item. The electronic commerce application 20 may also query the comparison database 46 to determine any terms that may persuade or entice the customer to switch items and merchants. The comparison database 46 may provide a comprehensive map of items, allowing the electronic commerce application 20 to make compelling suggestions for substitution. The electronic commerce application 20 sends a query to either database 44, 46, and 48. The electronic commerce application 20 then receives a response to the query via the communications network 32. Because querying databases is well known, FIG. 1 does not show the details of these querying operations.

The exemplary embodiments operate regardless of the network environment. The communications network 32 may have any structure, such as a cable network operating in the radio-frequency domain and/or the Internet Protocol (IP) domain. The communications network 32, however, may also include a distributed computing network, such as the Internet (sometimes alternatively known as the "World Wide Web"), an intranet, a local-area network (LAN), and/or a wide-area network (WAN). The communications network 32 may include coaxial cables, copper wires, fiber optic lines, and/or hybrid-coaxial lines. The communications network 32 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 2:
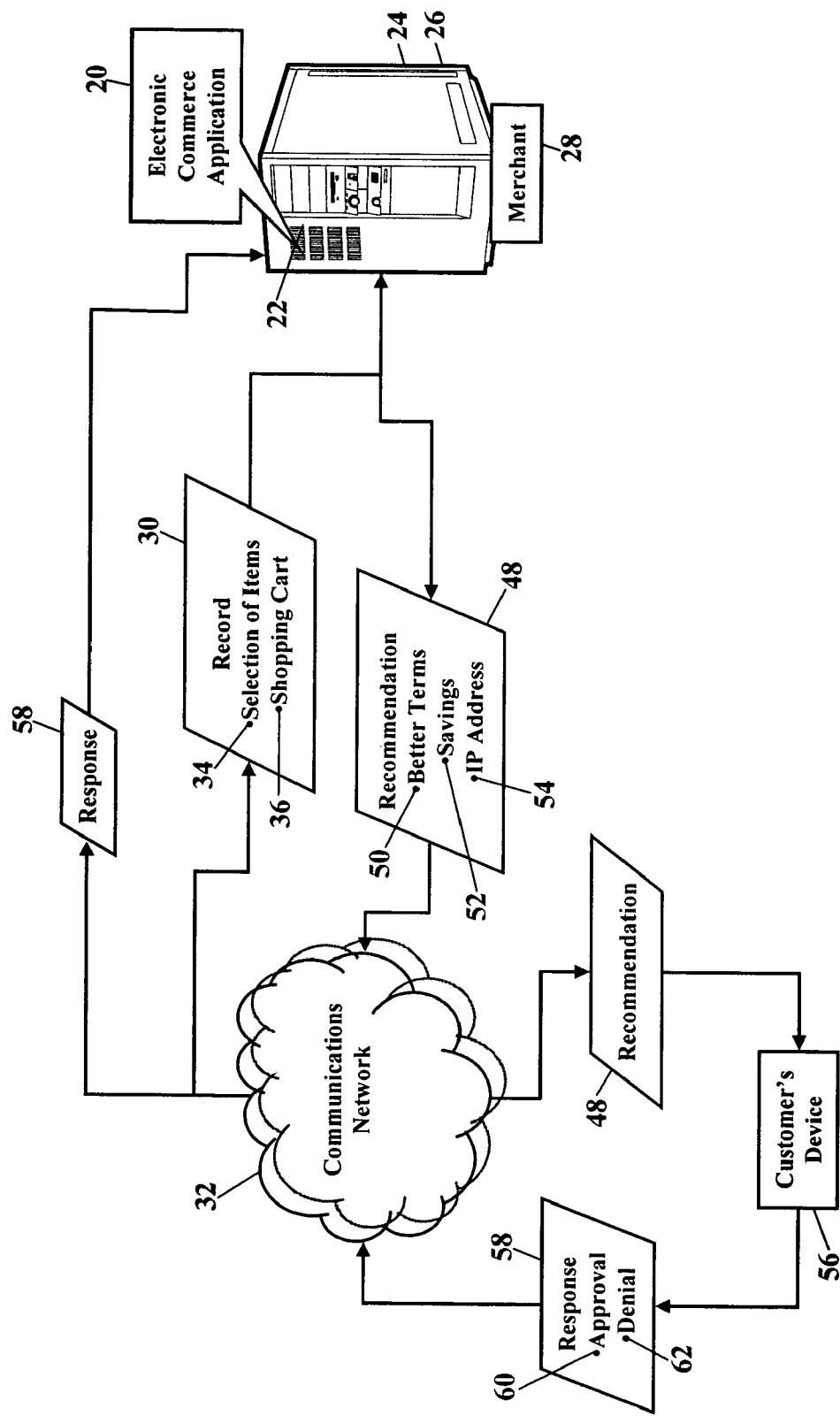
FIG. 2 is a schematic illustrating a recommendation process, according to more exemplary embodiments.

FIG. 2 is a schematic illustrating a recommendation process, according to more exemplary embodiments. When the electronic commerce application 20 determines that the merchant can offer better terms for an item, the electronic commerce application 20 sends a recommendation 48. The recommendation 48 describes the better terms 50 for the item. The recommendation 48 may also seek authorization to remove a different merchant's item and to instead add the merchant's own item to the record 30 (e.g., the shopping cart 36). The recommendation 48 may even describe the better terms 50 for multiple items associated with one or more different merchants. The recommendation 48 may include a savings 52. The savings 52 describes an amount of money that the customer will save by selecting the merchant's substitute item. The recommendation 48 communicates to an Internet Protocol address 54 associated with the record 30. FIG. 2 illustrates the recommendation 48 communicating to the customer's device 56 via the communications network 32.

FIG. 2 also illustrates a response 58, according to even more exemplary embodiments. Here the response 58 comprises an approval 60 for the merchant to remove the different merchant's item from the record 30. Recall the recommendation describes the better terms 50 for the item. The response 58, then, authorizes the electronic commerce application 20 to delete a different merchant's item from the record 30. The response 58, of course, may comprise a denial 62, where the customer does not authorize a substitution. The electronic commerce application 20 may additionally or alternatively assume a denial if no response to the recommendation 48 is received.

Figure 3:
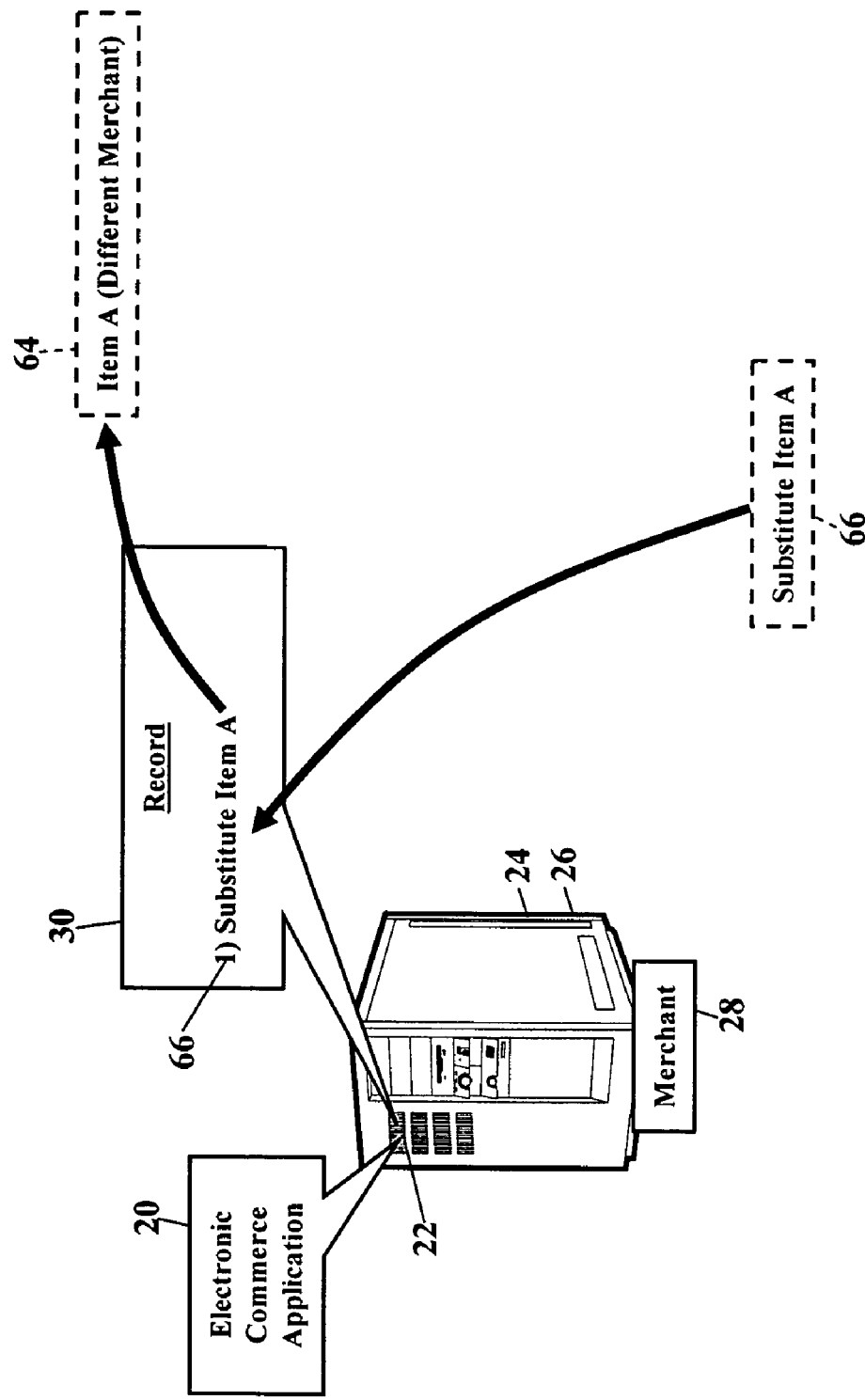
FIG. 3 is a schematic illustrating substitution of an item, according to even more exemplary embodiments.

FIG. 3 is a schematic illustrating substitution of an item, according to even more exemplary embodiments. Here the record 30 is shown storing in the memory 22 of the computer server 26. If the response (shown as reference numeral 58 in FIG. 2) provides authorization, the electronic commerce application 20 removes a different merchant's item 64 from the record 30. The electronic commerce application 20 then adds to the record 30 a substitute item 66. The substitute item 66 is associated with the merchant, such that the merchant's substitute item 66 replaces the different merchant's item 64. Suppose the record 30 contains a toaster oven selected from Wal-Mart's website. If, prior to check-out, the record 30 communicates to www.target.com, then the exemplary embodiments permit TARGET® to offer a lower price and/or better terms for the same or comparable toaster oven. Because exemplary embodiments permit TARGET® to inspect the contents of the record 30, TARGET® has an opportunity to offer a lower price for any item in the customer's shopping cart. If the customer provides authorization, TARGET® can remove Wal-Mart's toaster oven and, instead, add Target's substitute toaster oven. Exemplary embodiments, then, promote competition amongst merchants by allowing merchants to "peek" inside the record 30. Merchants may recommend alternative items, or cheaper items, that benefit the customer.

Figure 4:
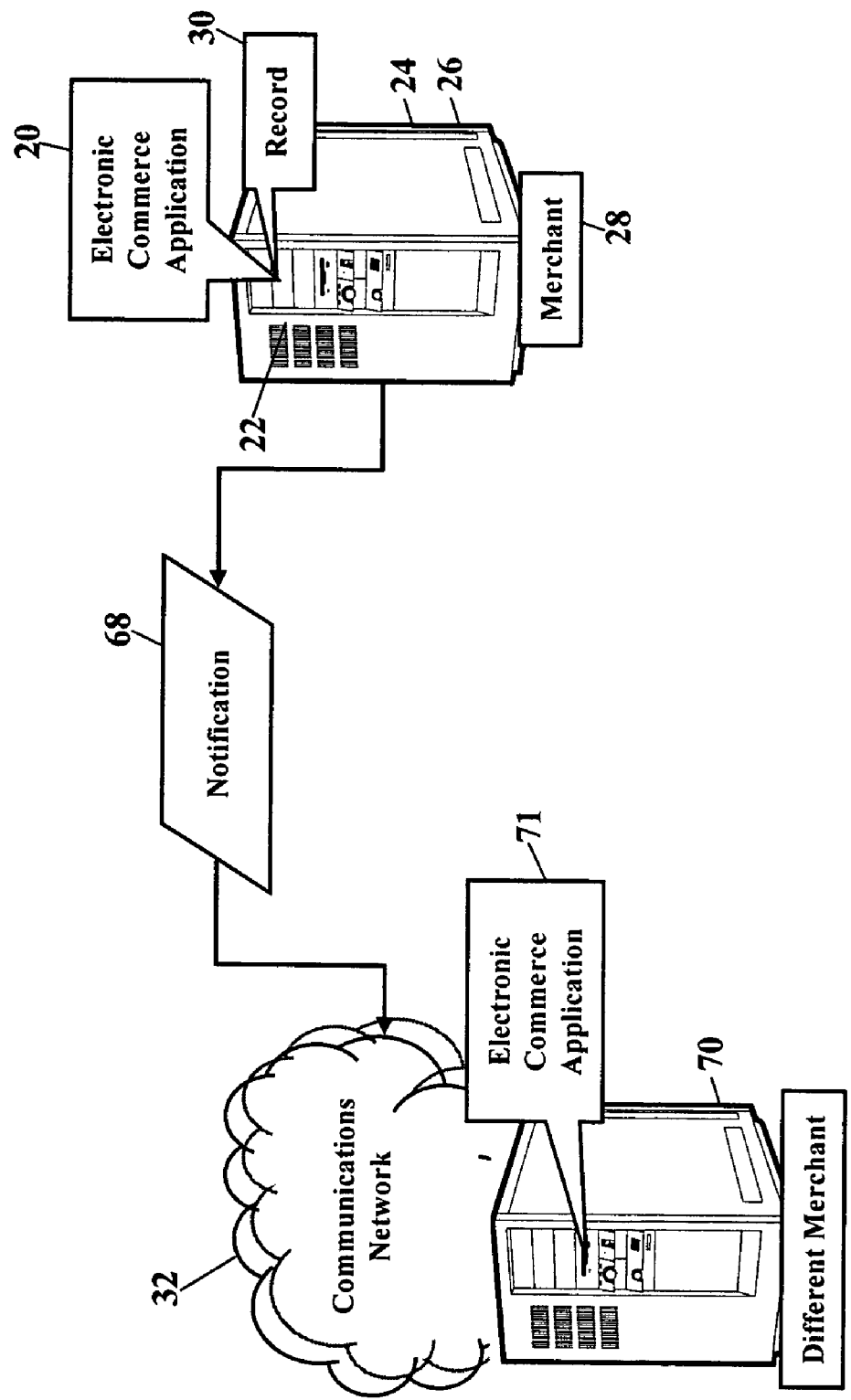
FIG. 4 is a schematic illustrating a notification procedure, according to still more exemplary embodiments.

FIG. 4 is a schematic illustrating a notification procedure, according to still more exemplary embodiments. If the customer provides authorization to substitute an item (such as the response 58 shown in FIG. 2), here the electronic commerce application 20 notifies the different merchant. That is, before an item is removed from the record 30, the electronic commerce application 20 sends a notification 68. The notification 68 communicates from the merchant's computer server 26. The notification 68 communicates via the communications network 32 to the different merchant, such as the different merchant's computer server 70. The different merchant's computer server 70 may store and execute a complimentary electronic commerce application 71. The notification 68 describes the recommendation to remove an item from the record 30. The notification 68 thus informs the different merchant's server 70 of the attempted substitution.

Figure 5:
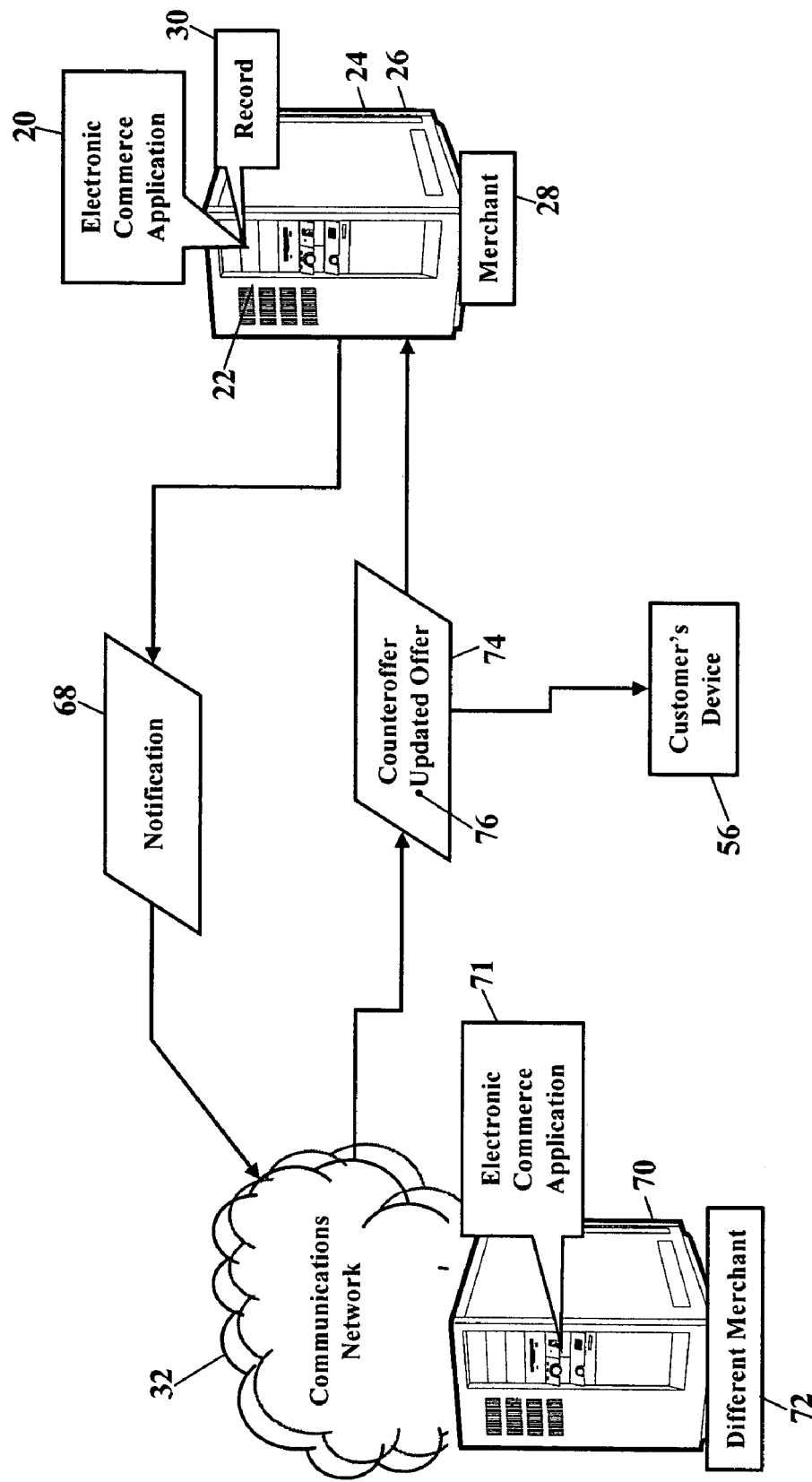
FIG. 5 is a schematic illustrating a counteroffer, according to exemplary embodiments.

FIG. 5 is a schematic illustrating a counteroffer, according to exemplary embodiments. When the different merchant's computer server 70 receives the notification 68, the different merchant 72 now knows the customer has authorized substitution of an item. The different merchant 72 knows a competing merchant has offered better terms (such as a lower price), and the different merchant's item is about to be removed from the record 30. Here, however, the different merchant's computer server 70 sends a counteroffer 74. The counteroffer 74 comprises an updated offer 76 to purchase the different merchant's item. The counteroffer 74 may communicate to the customer's device 56 via the communications network 24. The counteroffer 74 may additionally or alternatively communicate to the merchant's computer server 26 via the communications network 24. The customer and/or the electronic commerce application 20 may then compare the counteroffer 74 and decide which merchant's item is preferred. The customer and/or the electronic commerce application 20 selects the desired item and adds that desired item to the record 30, using known methods.

Figure 6:
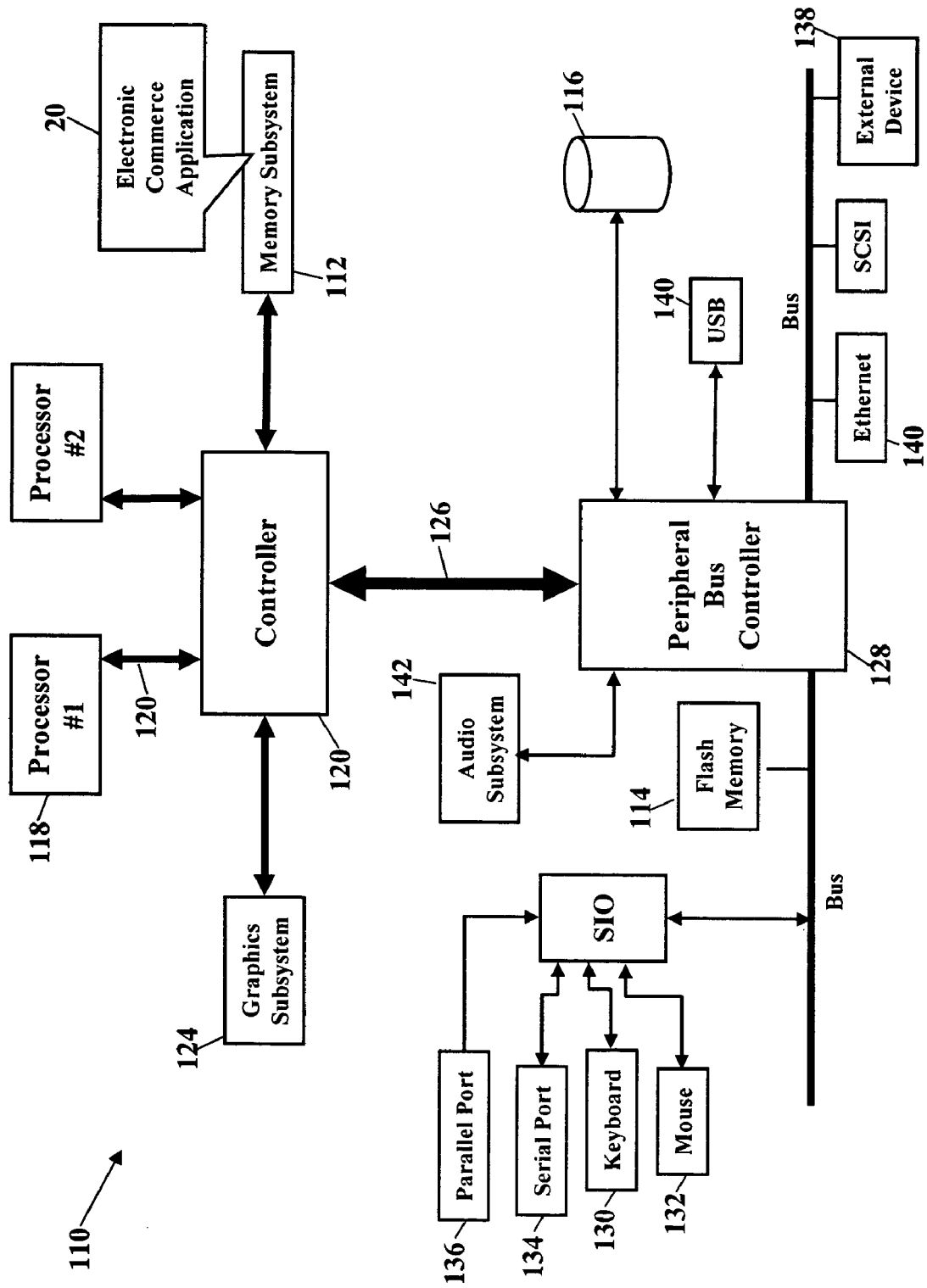
FIG. 6 depicts another possible operating environment for the exemplary embodiments.

FIG. 6 depicts another possible operating environment for the exemplary embodiments. FIG. 6 is a block diagram showing the electronic commerce application 20 residing in a computer system 110 (such as the computer server 26 and/or the different merchant's computer server 70 shown in FIG. 5). FIG. 6, however, may also represent a block diagram of any computer, any communications device, or processor-controlled device. The electronic commerce application 20 operates within a system memory device. The electronic commerce application 20, for example, is shown residing in a memory subsystem 112. The electronic commerce application 20, however, could also reside in flash memory 114 or peripheral storage device 116. The computer system 110 also has one or more central processors 118 executing an operating system. The operating system, as is well known, has a set of instructions that control the internal functions of the computer system 110. A system bus 120 communicates signals, such as data signals, control signals, and address signals, between the central processor 118 and a system controller 122 (typically called a "Northbridge"). The system controller 122 provides a bridging function between the one or more central processors 118, a graphics subsystem 124, the memory subsystem 112, and a PCI (Peripheral Controller Interface) bus 126. The PCI bus 126 is controlled by a Peripheral Bus Controller 128. The Peripheral Bus Controller 128 (typically called a "Southbridge") is an integrated circuit that serves as an input/output hub for various peripheral ports. These peripheral ports could include, for example, a keyboard port 130, a mouse port 132, a serial port 134, and/or a parallel port 136 for a video display unit, one or more external device ports 138, and networking ports 140 (such as USB or Ethernet). The Peripheral Bus Controller 128 could also include an audio subsystem 142. Those of ordinary skill in the art understand that the program, processes, methods, and systems described herein are not limited to any particular computer system or computer hardware.

One example of the central processor 118 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, the WINDOWS® (WINDOWS® is a registered trademark of Microsoft Corporation, One Microsoft Way, Redmond Wash. 98052-6399, 425.882.8080, www.Microsoft.com) operating system may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 112, flash memory 114, or peripheral storage device 116) may also contain an application program. The application program cooperates with the operating system and with a video display unit (via the serial port 134 and/or the parallel port 136) to provide a Graphical User Interface (GUI). The Graphical User Interface typically includes a combination of signals communicated along the keyboard port 130 and the mouse port 132. The Graphical User Interface provides a convenient visual and/or audible interface with a user of the computer system 110.

Figure 7:
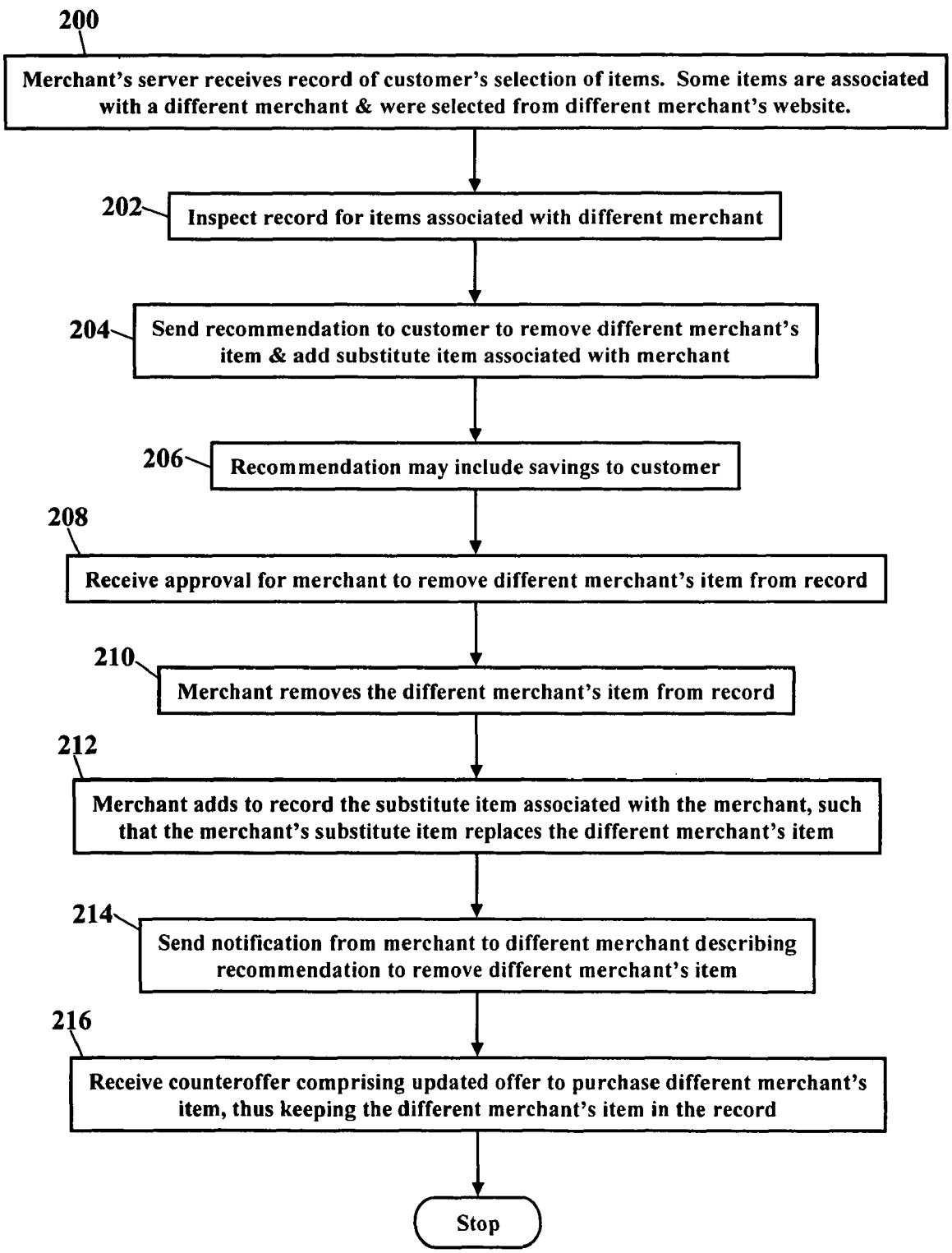
FIG. 7 is a flowchart illustrating a method of facilitating electronic purchases.

FIG. 7 is a flowchart illustrating a computer-implemented method of facilitating electronic purchases. A merchant's server receives a record of a customer's selection of items (Block 200). Some items in the record are associated with a different merchant and were selected from the different merchant's website. The record is inspected for items associated with the different merchant (Block 202). A recommendation is sent to the customer to remove a different merchant's item and to instead add a substitute item associated with the merchant (Block 204). The recommendation may include a savings to the customer (Block 206). The savings describes an amount of money that will be saved by selecting the merchant's substitute item. An approval is received from the customer for the merchant to remove the different merchant's item from the record (Block 208). The merchant removes the different merchant's item from the record (Block 210). The merchant adds to the record the substitute item associated with the merchant, such that the merchant's substitute item replaces the different merchant's item (Block 212). A notification may be sent from the merchant to the different merchant, and the notification describes the recommendation to remove the different merchant's item (Block 214). A counteroffer may be received from the different merchant, and the counteroffer comprises an updated offer to purchase the different merchant's item and, thus, keep the different merchant's item in the record (Block 216).

The electronic commerce application (shown as reference numeral 20 in FIGS. 1-6) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the calendaring application to be easily disseminated. A computer program product comprises the electronic commerce application stored on the computer-readable medium. The electronic commerce application comprises computer-readable or computer-implemented instructions/code for managing communications.

The electronic commerce application may be physically embodied on or in any addressable (e.g., HTTP, I.E.E.E. 802.11, Wireless Application Protocol (WAP)) wireless device capable of presenting an IP address. Examples could include a computer, a wireless personal digital assistant (PDA), an Internet Protocol mobile phone, or a wireless pager. Those of ordinary skill in the art will recognize that this solution applies to addressing schemes that may be developed in the future.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A computer-implemented method of facilitating electronic purchases, comprising:

receiving at a merchant's server an electronic shopping cart comprising a selection of items of a customer from different merchants, with some items associated with a different merchant and selected for purchase from a different merchant's website;

inspecting the electronic shopping cart for other items associated with the different merchant;

sending a recommendation to the customer via a communications network to remove a different merchant's item and to instead add a substitute item associated with the merchant;

seek authorization from the customer to replace the different merchant's item with the substitute item;

receive a response from the customer via the communications network that authorizes removal of the different merchant's item from the electronic shopping cart;

replacing the different merchant's item in the electronic shopping cart with the substitute item associated with the merchant;

sending a notification from the merchant to the different merchant, the notification describing the recommendation to remove the different merchant's item;

receiving a counteroffer from the different merchant, the counteroffer comprising an updated offer to purchase the different merchant's item; and permitting the customer to compare the counteroffer with the substitute item and to select a desired item to be added to the electronic shopping cart.

2. A computer-implemented method according to claim 1, wherein sending the notification comprises sending the notification to a server associated with to the different merchant.

3. A computer-implemented method according to claim 1, further comprising including descriptions of the selection of items in the electronic shopping cart.

4. A computer-implemented method according to claim 1, wherein the sending the recommendation comprises sending a savings describing an amount of money that will be saved by selecting the substitute item.

5. A method according to claim 1, further comprising commencing a single sale transaction.

6. A method according to claim 1, further comprising determining when a lower price may be offered for the different merchant's item.

7. A system, comprising:
a processor executing code stored in memory that causes the processor to:
receive at a merchant's server an electronic shopping cart comprising a selection of items of a customer, with some items associated with the merchant and at least one item associated with a different merchant and selected for purchase from the different merchant's website;
prior to checkout, inspect the electronic shopping cart by the merchant's server for an item associated with the different merchant;
determine that the item is found in the electronic shopping cart;
determine that the merchant offers a better term for the item;
send a recommendation to the customer via a communications network that describes the better term offered by the merchant and that seeks authorization from the customer to replace the item with a substitute item from the merchant;
receive a response from the customer via the communications network that authorizes removal of the item from the electronic shopping cart;
replace the item in the electronic shopping cart with the substitute item from the merchant;
send a notification from the merchant's server to a server associated with the different merchant that describes the recommendation to replace the item with a substitute item from the merchant;
receive a counteroffer from the server that comprises an updated offer to purchase the item from the different merchant; and
permit the customer to compare the counteroffer with the substitute item and to select a desired item to be added to the electronic shopping cart.

8. A system according to claim 7, further comprising means for receiving a denial to remove the different merchant's item from the electronic shopping cart.

9. A system according to claim 7, further comprising means for sending a savings to the customer, the savings describing an amount of money that will be saved by selecting the merchant's substitute item.

10. A system according to claim 7, wherein the code further causes the processor to send descriptions of the selection of items in the electronic shopping cart.

11. A system according to claim 10, wherein the code further causes the processor to commence a single sale transaction.

12. A non-transitory computer program product storing comprising computer-readable instructions for performing a method of facilitating electronic purchases, the method comprising:
receiving at a merchant's server an electronic shopping cart comprising a selection of items of a customer, with some items associated with the merchant and at least one item associated with a different merchant and selected for purchase from a different merchant's website;
prior to checkout, inspecting the electronic shopping cart by the merchant's server for the at least one item associated with the different merchant;
determine that a different merchant's item is found in the electronic shopping cart;
determine that the merchant offers a better term for the different merchant's item;
send a recommendation to the customer via a communications network that describes the better term offered by the merchant and that seeks authorization from the customer to replace the different merchant's item with a substitute item from the merchant;
receive a response from the customer via the communications network that authorizes removal of the different merchant's item from the electronic shopping cart;
replacing the different merchant's item in the electronic shopping cart with the substitute item associated with the merchant;
sending a notification from the merchant's server to a server associated with the different merchant that describes the recommendation to replace the item with a substitute item from the merchant;
receiving a counteroffer from the server that comprises an updated offer to purchase the item from the different merchant; and
permitting the customer to compare the counteroffer with the substitute item and to select a desired item to be added to the electronic shopping cart.

13. A computer program product according to claim 12, further comprising instructions for receiving a denial to remove the different merchant's item from the electronic shopping cart.

14. A computer program product according to claim 12, further comprising instructions for sending a savings to the customer, the savings describing an amount of money that will be saved by selecting the substitute item.

15. A computer program product according to claim 12, further comprising instructions for commencing a single sale transaction.

* * * * *